Oct. 30, 1956  J. E. JACOBI  2,769,125
MULTI-SPEED SYNCHRO DATA TRANSMISSION SYSTEM
Filed Oct. 22, 1953.  2 Sheets-Sheet 1
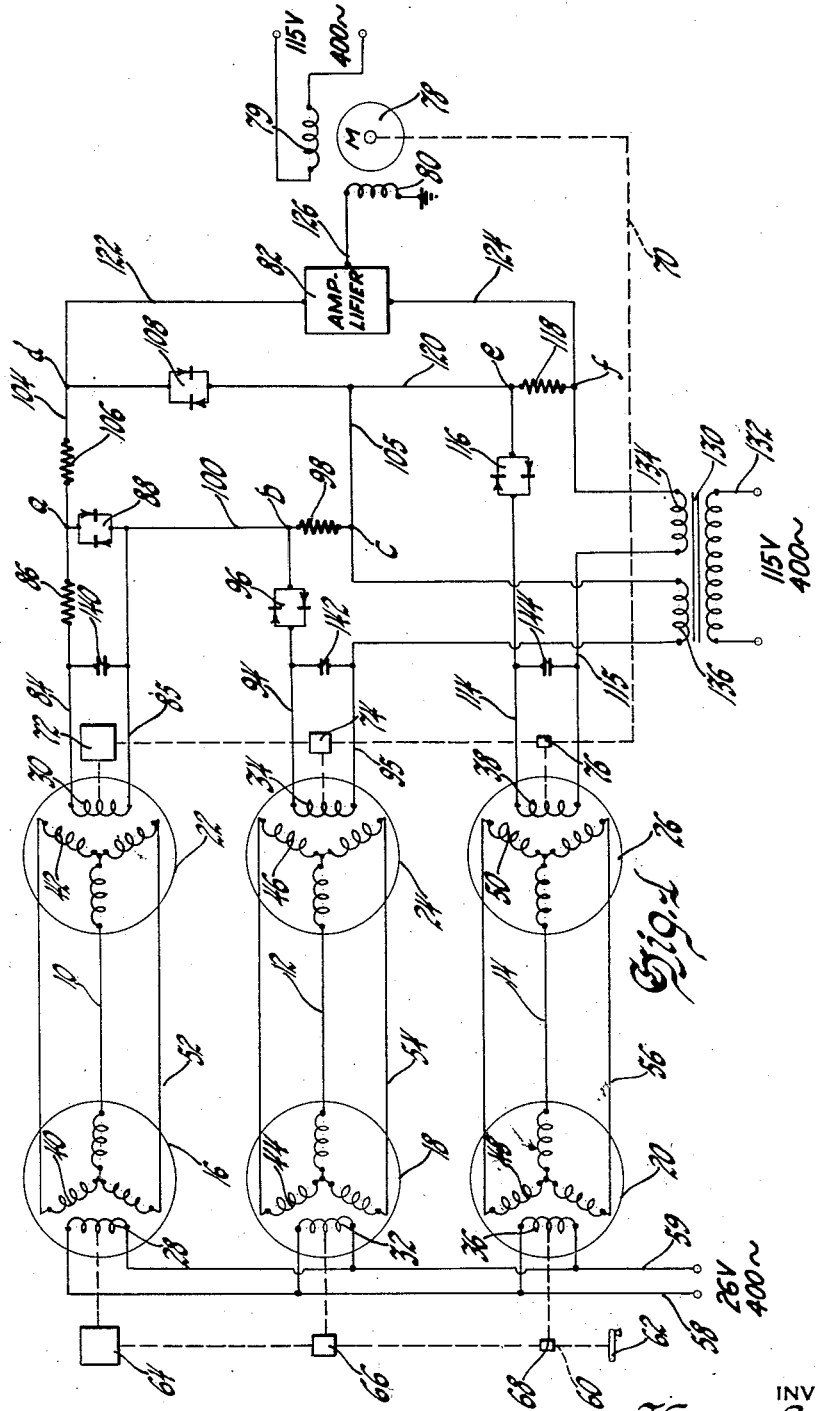
INVENTOR
Thomas E. Jacobi
BY
L. D. Burch
ATTORNEY

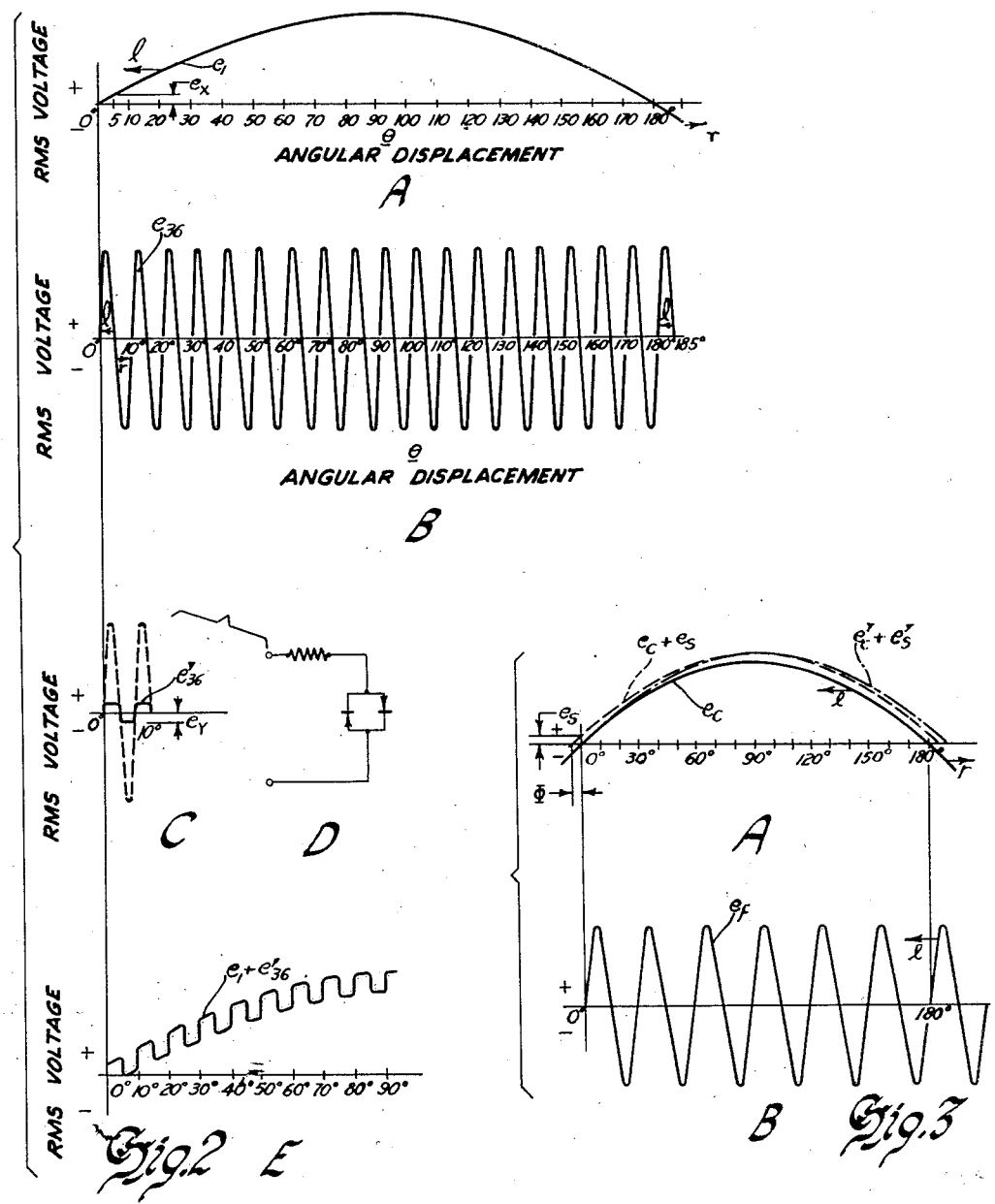

United States Patent Office 2,769,125
Patented Oct. 30, 1956

2,769,125

MULTI-SPEED SYNCHRO DATA TRANSMISSION SYSTEM

Thomas E. Jacobi, Milwaukee, Wis., assignor to General Motors Corporation, Detroit, Mich., a corporation of Delaware Application October 22, 1953, Serial No. 387,721

1 Claim. (Cl. 318—30)

This invention relates to a multi-speed synchro data transmission system for use in remote electrical position control systems and, more particularly, to a synchro system employing three or more data channels for applications where extremely fine, accurate and fast response may be required.

In remote electrical position systems were the accuracy of data transmission required is greater than that which can be obtained with a single speed system, a second data transmission channel operating at a higher speed than the first channel generally is employed. Each data channel includes a signal voltage transmitter and a receiver or control transformer. The transmitter, which may be connected either at the controlling end or controlled end of the positioning system, generates a control signal corresponding to the position of, say, a controlling object. This signal is supplied to the receiver or control transformer, which may be connected either at the controlled end or controlling end of the positioning system depending upon the location of the transmitter. The receiver, energized by the control signal from the transmitter, develops an output voltage that is proportional to the error or displacement of the controlling object from its original position. The error or output voltage is applied to a servo follow-up system that adjusts the position of the receiver or control transformer at one end of the system to correspond with the transmiter at the other end.

Where more than one data transmission channel is to be employed, a suitable form of selector means must be provided between the outputs of the associated channels in order to control the servo system from the output of the high speed or fine channel for small magnitudes of displacement error until the control signal from the data transmission system exceeds a certain magnitude when the output of essentially the low speed or coarse data channel will be effective to control the servo system for greater magnitude displacement errors. To this end various forms of selecting devices have been employed including electro-mechanical relays, gas discharge tubes such as neon tubes, vacuum tube diodes and semi-conductor type rectifiers such as selenium rectifiers. All but the last named selecting device usually must be used with associated electronic tubes and vacuum tube amplifiers, which, as is well known, are complex and generally unreliable for use in aircraft service and in devices subject to shock and vibration.

While selenium rectifier type selectors (also known as "selenium limiters") have been proposed for use in selector circuits for combining the channel outputs of a two speed transmission system having a speed ratio of 36:1, for example, it has been found that the capabilities of presently available forms of selenium limiters are exceeded where the speed ratio of the combined channels is, say, doubled or several times in excess of this amount, as where it is desired to provide a 360 speed channel, for example. While electronic amplifiers, connected to block or to amplify the output of one or more channels in relation to the controlling channel, could be employed to avoid the above noted effect, this expedient adds relatively unreliable vacuum tubes to the system.

Accordingly, the present invention seeks generally to provide a multi-speed synchro data transmission system which is possessed of extremely fine, highly accurate and fast response characteristics and has as an object thereof to provide such a system in which high speed ratios may be attained in a simple manner without the aforementioned and other difficulties.

Another object is to provide a selector circuit for such a data transmission system in which relays or tubes are not employed.

Another object is to provide a selenium rectifier type selector circuit for a multi-speed synchro data transmission system in which the capabilities of the selenium limiters available are not exceeded.

The above and other objects together with the manner in which they are accomplished will appear more fully from the following detailed description and drawings, wherein:

Fig. 1 is a schematic circuit diagram of a multi-speed synchro data transmission system in accordance with the present invention; and Figs. 2A to 2E and 3A and 3B are curves and diagrams useful in explaining principles employed in the invention.

Referring to the drawings, there is shown in Fig. 1 a remote electrical position control system which includes a multi-speed data synchro transmission system in accordance with the present invention comprising a high-speed channel 10, a medium speed channel 12 and a low speed channel 14, the channels having generating or transmitting devices 16, 18 and 20 and remote receiving devices connected as control transformers 22, 24 and 26 therein. The transmitters and control transformers may be conventional A. C. energized synchronous devices of the type well known in the art having rotor windings, which are designated in respective ones of said channels as 28, 30; 32, 34; and 36, 38, and Y-connected stator armature windings, which are designated in respective ones of said channels as 40, 42; 44, 46; and 48, 50, the respective stator windings of the transmitter and control transformer of each of said channels being connected over the conductor group lines 52, 54, and 56, as shown.

The transmitter rotors are connected electrically at the controlling end of the position control system for energization over a pair of conductors 58, 59 from a single phase A. C. power source, which could be a 26 v. 400 cycle generator used in aircraft service. The transmitter rotors are connected mechanically to suitable driving means such as an input shaft 60 having a presetting mechanism or handwheel 62 thereon and suitable gearing 64, 66, 68 associated therewith through which the transmitter rotor 28 of the high speed channel 10 may be driven, say, in a speed ratio of 360:1 relative to the low speed channel, the transmitter rotor 32 of the intermediate speed channel 12 in a speed ratio of, say, 36:1 and the transmitter rotor 36 of the low speed channel directly driven in a ratio of 1:1 from the speed input shaft, respectively.

The rotors of the control transformers 22, 24 and 26 at the controlled end of the position control system are connected mechanically to an output shaft 70 having suitable gearing 72, 74 and 76 associated therewith through which their respective rotors 30, 34 and 38 may be driven in the same speed ratios as the rotors of the corresponding transmitter elements in relation to the rotor 38 of the low speed control transformer. The output shaft 70 is driven from a reversible servomotor 78 which may be a conventional two phase A. C. motor. The motor 78 is provided with a reference winding 79 which may be energized from a 115 volt 400 cycle A. C. power source, for example, and a control winding 80, which is connected to be energized from the combined outputs of all of the control transformers through the combining selector scheme described below and a servo amplifier 82, which together with the motor 78 and output shaft 70 constitutes a servo follow-up system.

The electrical output of the high speed synchro data channel 10 is taken from the rotor 30 of the control transformer 22 thereof over the conductors 84, 85 and applied to a series connected impedance 86 and a voltage limiter device 88, which may consist of two conventional half-wave selenium rectifiers connected in parallel with opposite polarity, as shown schematically in Fig. 1. The impedance 86 associated with the limiter 88 and the impedances associated with the other limiters described below are preferably resistances having an ohmic value of say about 2,000 ohms. The electrical output of the medium speed channel 12 is taken from the rotor 34 of the control transformer 24 thereof over the conductors 94, 95 and applied across a series connected voltage limiter 96 and an impedance 98, the junction $b$ therebetween being connected over conductor 100 to conductor 85, as shown. The impedance 86 and limiter 88 in the output of the high speed channel 10 constitute the principal parts of a sub-selector or anterior combining circuit that serves to combine the output of the high speed channel with that of the medium speed channel 12. The oppositely connected arrangement of the limiter 96 and impedance 98 in the output of the medium speed channel 12 forms another part of the sub-selector circuit and serves to block or limit the initial output of this channel from adding to the output from the high speed channel 10 over the initial range of displacement error when essentially the output of the high speed channel is controlling the servo system, as will be brought out below. The combined outputs of the high speed channel 10 and medium speed channel 12 appears as a resultant voltage at the output of the limiter 88 and the impedance 98 across the circuit junction points $a$, $c$ and is applied over conductors 104 and 105 to a second or posterior selector circuit connected in cascade with the output of the first or anterior selector circuit.

The second or posterior selector circuit is composed principally of the impedance 106 and double limiter arrangement 108 serially connected across the circuit junctions $a$, $c$ and preferably further includes the limiter arrangement 116 and impedance 118 in the output of the low speed channel 14, as shown. The second or posterior selector circuit combines the combined outputs of the high speed channel and intermediate speed channel appearing across the limiter 88 and impedance 98 with the output of the low speed channel 14, which is taken from the rotor 38 of the control transformer 26 thereof over the conductors 114 and 115 and applied through the limiter 116 and its series impedance 118, the junction $e$ between the latter elements being connected over conductor 120 to conductor 105, as shown.

The individual outputs of the three channels are thus combined in two successive steps or stages by the cascaded selector circuits 86, 88, 96, 98 and 106, 108, 116, 118 and the resulting output voltage of the two stage selector circuit appearing across the circuit junctions points $d$, $f$ is applied over conductors 122 and 124 to the input of the servo amplifier 82, the output of which is connected over conductors 126 and 128 to the control winding 80 of the servomotor 78.

Each of the limiters 88, 96, 108 and 116 is constituted by a pair of non-linear semi-conductor devices connected in parallel to pass alternating current and may be conventional selenium rectifier units or other semi-conductor devices of substantially similar characteristics. The limiters also could be any single non-linear impedance device of suitable characteristics. The servo amplifier 82 may be of a conventional type employed in servo follow-up systems.

The purpose served by and the manner of operation of a selenium limiter may be illustrated by considering a dual speed synchro data transmission system the two channels of which operate in a speed ratio of, say, 36:1. Fig. 2A depicts the voltage variation from the output of the low or 1-speed channel when the transmitter thereof is turned through slightly more than half a revolution represented by a displacement angle $\theta$ slightly greater than 180 degrees, and Fig. 2B, the corresponding variation in the output error voltage from the 36-speed channel. Since the transmitter and control transformer synchros of each channel are identical, the output voltage from each channel will be of equal magnitude. When the error voltage applied to the servomotor of the position control system in which the synchro data transmission system is employed is positive or above the abscissa, the servomotor will drive in one direction, say, to the left, as indicated by the arrow $l$, and when the error voltage is negative or below the abscissa, the servomotor drives in the opposite direction, or to the right as indicated by the arrow $r$. It will be seen that were the output voltage $e_1$ of the coarse or 1-speed channel directly combined with the output voltage $e_{36}$ of the 36-speed channel, the resultant output voltage would reverse phase or polarity at an error angle $\theta$ of slightly more than 5 degrees. Consequently, the servomotor would reverse rotation and tend to drive in the opposite direction from which it was driving for an initially low error angle, and the system, therefore, would not be synchronized.

By applying the output of the 36-speed channel to a parallel connected double limiter arrangement shown in Fig. 2d, which has a high resistance for low magnitude input voltages applied thereto and a low resistance for high input voltages, a double limited wave $e'_{36}$, such as that depicted in Fig. 2C, is obtained. This wave—when now combined with the output voltage $e_1$ of the 1-speed channel—will yield a resultant wave $e_1+e'_{36}$ similar to that depicted in Fig. 2E. So long as the amplitude $e_y$ of the limited wave $e'_{36}$ of Fig. 2C is less than the amplitude $e_x$, which is taken at an error angle $\theta$ of about 5 degrees on the space diagram of the error output voltage $e_1$ of the 1-speed channel in Fig. 2A, the wave resulting from the combining of the outputs of the 1- and 36-speed channels will not reverse phase or polarity in this region, and the channels will be maintained in synchronism. For initially low values of displacement error less than 5 degrees, the servomotor will be controlled essentially from the output of the 36-speed channel, the output of which presents a high and rapidly rising wave front that increases the torque, speed of response and inherent accuracy of the positioning system over that which would be obtained with simply a single channel synchro data system.

Now, if the speed of the higher speed channel of the illustrative dual speed system under discussion, were increased to say, 360, in relation to the low speed channel in order, for example, to provide a remote electrical position control system in which an accurate indication of only a few seconds of error or displacement angle is to be obtained, the output voltage of the high speed channel will dip or reverse polarity of $\pm \frac{1}{2}$ degree intervals instead of at intervals of $\pm 5$ degrees, as was the case in Fig. 2B. If the output of the 360-speed channel were directly combined through the selenium limiter with the output of the 1-speed channel, it will be found that the limiter cannot provide sufficient and effective limiting action necessary to combine the outputs of such speed ratio channels. Actually, the limiters currently available are theoretically good for a maximum speed ratio of about 100:1, but the practical maximum is more in the order of about 50:1.

In recognition of the above and in order to obviate such difficulties in a high speed ratio multi-speed transmission system without resorting to the use of electronic amplifying equipment in the data channels, the total speed range of the system is divided, in accordance with the present invention, into a number of sections or channels having such speed ratios as not to exceed the capabilities of the selenium limiter, and the outputs from the various channels are combined in several steps or successive stages by using several limiters, the number of combining limiters being one less than the number of data channels or speed sections employed. For a total speed range of 360:1 the present invention provides the 3 channel system of Fig. 1 having an intermediate speed channel 12 operating at a speed of say, $\frac{1}{10}$ that of the high speed channel 10 and 36 times that of the low speed channel 14, which ratios are clearly within the effective operating range of the limiters mentioned above. The output of the 360-speed channel 10 is first combined with that of the 36-speed channel by the limiter arrangement 86, 88, and the combined output appearing across the limiter 88 is then combined with the output of the 1-speed channel 14 through the limiter arrangement composed of the impedance 106 and limiter 108.

The illustrated speed ratios of 1:36:360 were chosen because they result in convenient dial scales, facilitate readings and computations and simplify mechanical design considerations, although different speed ratios can be employed, of course. Where, instead of an odd speed ratio, the speed ratios between the several data channels are even numbers, as in the 3-speed data transmission system disclosed herein, it is possible for the system to fall out of synchronism or to lose count or track of one-half of a full revolution of the low speed channel. This action may be illustrated in an even ratio dual-speed system, the synchro outputs of which may be as shown in Figs. 3A and 3B. It will be noted that when the output signal $e_c$ (Fig. 3A) of the coarse or 1-speed channel passes through a displacement angle $\theta$ of 180 degrees and reverses phase or polarity, the output voltage $e_f$ (Fig. 3B) of the fine or higher speed channel passing through the region where $\theta$ is 180 degrees is of the opposite polarity and is of such magnitude as to cause the servomotor to drive to the left back to reference zero position rather than toward the right, the direction in which the output of the low speed channel is tending to drive the servo-motor to complete a full revolution thereof. Consequently the system will tend to settle in a false null or false zero position.

In order to avoid the above effect in the even speed ratio three channel data system of Fig. 1, "anti stick-off" voltages are inserted in the medium or 36-speed channel 12 thereof, as well as in the low or 1-speed channel 14 by a step-down transformer 130 having a primary winding 132, which may be energized from say, a 115 volt 400 cycle source, and a pair of low voltage secondary windings 134, 136, which are connected, respectively, in conductor 95 of the medium speed channel 12 and conductor 115 of the low speed channel 14, as shown.

The addition of a suitable magnitude "stick-off" voltage to one of a pair of even speed ratio channels may be illustrated by again considering the curves of Figs. 3A and 3B. The space diagram of the low or coarse speed synchro error voltage is represented by the curve $e_c$ of Fig. 3A, and the addition of a small magnitude alternating "stick-off" voltage $e_s$ thereto by the dashed space curve $e_c + e_s$. By displacing the dashed curve $e_c + e_s$ by the angle $\Phi$, so as to reference this curve to zero, the dashed-dot curve $e_c' + e_s'$ is obtained, the phase or polarity of which in the troublesome region just past 180° is such as to correspond with that of the higher speed channel $e_f$—illustrated in Fig. 3B—and the magnitude of which is such as to prevent loss of synchronism between the even speed ratio channels.

The iron contained in the synchro transmitter and control transformer devices imparts an inductive reactance character, thereto, whereby the error output voltages of these devices exhibit a marked quadrature component. This quadrature component voltage is of relatively constant amplitude and is initially larger than the in-phase component of the output therefrom over a small range of displacement error, and, if uncorrected or uncompensated, impairs the signal-to-noise ratio of the system in which these devices are incorporated. Accordingly, the limiter circuit 96, 98 is provided in the output of the medium speed channel 12 and a similar limiter circuit 116, 118 is provided in the output of the low speed channel 14 in order to block the initial outputs of these channels—composed essentially of the above quadrature component—over a small portion of the displacement characteristic thereof when the output of the channel 12 is being combined with the high speed channel 10 and when the output of the low speed channel 14 is being combined with the combined outputs of channels 10 and 12.

Where the quadrature component or initial output of the successively lower speed channels employed in a multiple channel system is of sufficiently low magnitude, the blocking limiter arrangements 96, 98 and 116, 118 in the medium and low speed channels could probably be eliminated without appreciable impairment or deterioration of the system accuracy.

In order to eliminate the effect of the appreciable phase shift imparted to the output voltage by the inductive impedance component of the synchro devices, and also to eliminate or reduce harmonic voltages which frequently appear in the output of the synchro devices, the transmission system of Fig. 1, is further provided with suitable tuning capacitors 140, 142 and 144, which are connected across the rotors of the control transformers 22, 24 and 26, whereby the overall accuracy of the system is further improved. A typical individual value for such capacitors may be 0.8 microfarad.

What is claimed is:

In a multi-speed synchro data transmission system having a plurality of transmitter-receiver synchro data channels including a low speed channel and a high speed channel operative at a particular speed ratio therebetween and having selenium-type limiter circuits therein combining the electrical outputs of said channels taken in pairs, said selenium limiter circuits being capable of combining the electrical outputs of a pair of channels operative at a practical maximum speed ratio for effective limiting action of said limiters less than said particular speed ratio of said low speed channel and said high speed channel, a third synchro data transmission channel operative at a speed intermediate to that of said low speed channel and said high speed channel and providing speed ratios therewith less than the practical maximum speed ratio of said limiters, and a two stage selenium limiter circuit having one stage combining the electrical outputs of said high speed channel and said intermediate speed channel followed by another stage combining the resultant output of said high speed channel and said intermediate speed channel with the output of said low speed channel.

References Cited in the file of this patent

UNITED STATES PATENTS

| | | |
|---|---|---|
| 2,424,568 | Isbister et al. | July 29, 1947 |
| 2,455,364 | Hays | Dec. 7, 1948 |
| 2,493,605 | Warsher | Jan. 3, 1950 |
| 2,560,337 | Fouassin | July 10, 1951 |